(No Model.)

F. M. WELLER.
Vacuum Creamer.

No. 242,172.

Patented May 31, 1881.

Witnesses:
F. B. Townsend
W. S. Alligan

Inventor:
Fayette M. Weller

N. PETERS, Photo-Lithographer, Washington, D. C.

UNITED STATES PATENT OFFICE.

FAYETTE M. WELLER, OF CHICAGO, ILLINOIS.

VACUUM-CREAMER.

SPECIFICATION forming part of Letters Patent No. 242,172, dated May 31, 1881.

Application filed March 23, 1880. (No model.)

*To all whom it may concern:*

Be it known that I, FAYETTE M. WELLER, of the city of Chicago, in the county of Cook and State of Illinois, have invented certain new and useful Improvements in Vacuum-Creamers, of which the following is the specification, reference being had to the accompanying drawings, and to the letters and figures marked thereon, forming a part of this specification.

The object of my invention is to treat milk at the most convenient time after it is obtained from the cow, adjust the temperature by bringing it to the desired degree of heat, purify it by removing or extracting all animal and other foreign odors from it, and separate all the cream in a pure state in the shortest time possible.

My invention consists of a tank, with lid, apertures, valves, and pipes, so constructed and arranged as to be made absolutely impervious to air and water, and also be capable of being filled, emptied and changed at will, within which tank is placed the milk in separate vessels, and in connection with the tank a water-pump placed in such relation to the tank, the air-chamber of the pump being lower than the bottom of the tank, that by its action and the gravitation of the water the tank can be wholly emptied and a vacuum formed within it.

Figure 1:
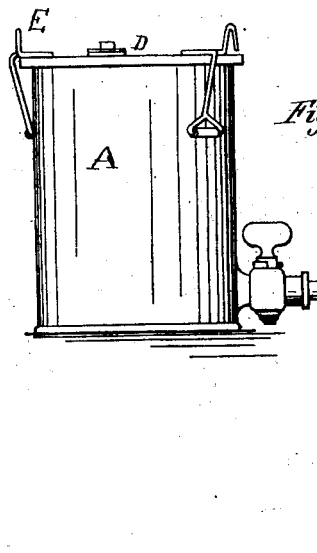
Figure 2:
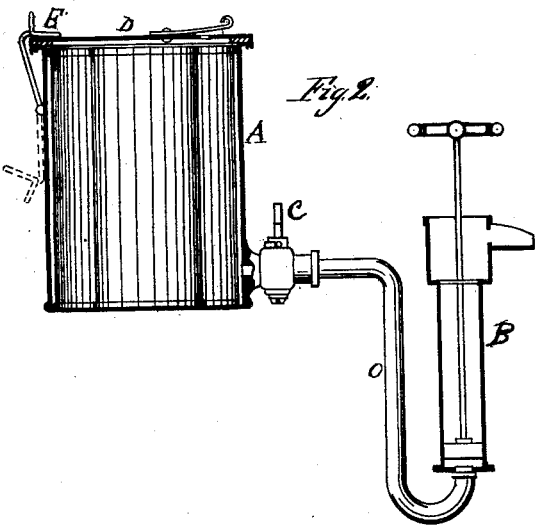
Figure 3:
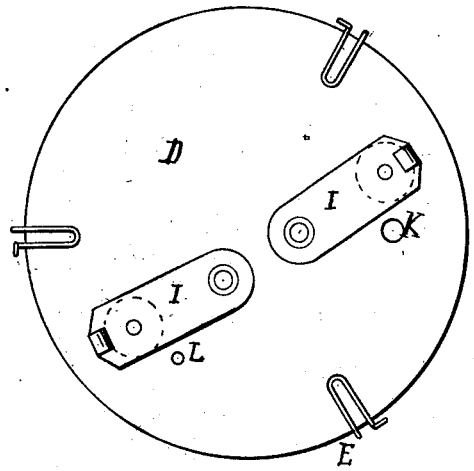
Figure 4:
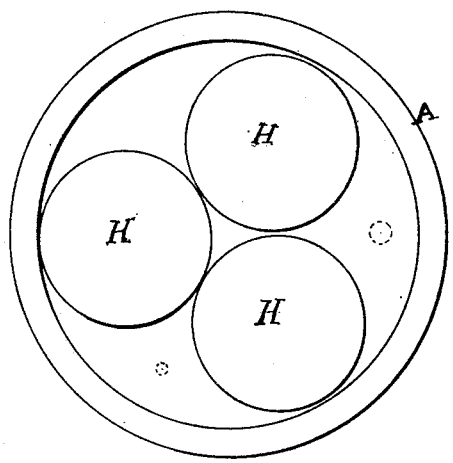

In the accompanying drawings, in which similar letters of reference refer to similar parts in the different figures, Figure 1 is an upright view of my invention. Fig. 2 is a vertical section. Fig. 3 is a top view of the tank with the cover on; and Fig. 4 is a top view of the tank with the cover removed, showing the milk-cans in position.

A is the tank, made of wood, metal, or any suitable material, and of any desirable form.

D is the cover, fastened onto the tank with an air-tight joint, made so by the use of suitable packing, and held there by the clamps E.

B is the pump, connected with the tank by the tube O, which is so bent and arranged as to bring the air-chamber, or rather piston-barrel, of the pump lower than the tank. The pump and tube are made detachable.

C is a stop-cock.

H H H are the milk-cans within the tank A, placed at such height as to bring the brim in contact and form a joint (not air-tight) with the tank-cover; or they may be supplied with loose covers to prevent accidental ingress of water while the tank is filled.

I I are valves or stops, so adjusted as to close tightly the holes K and L at pleasure.

K is a hole passing into the cavity of the tank for the purpose of admitting water into the tank.

L is a hole that allows the air to escape while the tank is being filled with water.

The operation of my invention is as follows: The cans H H H, being completely filled with milk, are placed within the tank A. The cover D is put on and securely fastened air-tight. The stop-cock C is closed. Water at suitable temperature is now introduced through the hole K around the cans till the air is expelled through the hole L and the tank filled. The water is allowed to remain till the milk is brought to the desired temperature, when, the openings K and L being closed by their appropriate stops, the stop-cock C is opened and the water drawn out by the action of the pump, leaving a vacuum within the tank.

The operation of the pump in producing a vacuum within the tank is simple. As the pump-barrel is on a lower plane than the tank, when the piston is raised the water falls from the tank to fill the space in the barrel, where otherwise there would be a vacuum, in accordance with the well-known fact that water, by its own gravity, will fall to the lowest space in a vacuum, and accordingly to the lowest of two intercommunicating vacuums.

The use of the vacuum in purifying milk and raising the cream will be understood by considering that milk is composed of serum and caseine (whey and curd) chemically combined, while the oil, cream, or butter, though always present in the new milk, being diffused through it in the form of globules, is not chemically combined with it, but merely held in suspension, forming a mechanical mixture, as are also certain substances derived from the cow—animal odors, or properly animal gases. Allowed to stand, these substances separate by gravitation, the milk taking the lowest place, forcing the lighter cream to its surface and the still lighter gases above the cream. The ordinary pressure of the atmosphere on the surface of the milk retards this separation; hence by the removal of pressure by the rarefaction or withdrawal of the atmosphere, as in the vacuum-creamer, the process is facilitated and perfected. The vacuum produced, the apparatus is allowed to stand till the cream is completely separated, unless by excessive escape of gas, vapor, accidental leakage, or other cause the vacuum is materially neutralized, when the difficulty is remedied by refilling the tank with water and exhausting as before.

What I claim as my invention is—

The cans H H H and the tank A, with the apertures, stops, tube, and pump, all constructed and arranged substantially as and for the purposes described and set forth.

FAYETTE M. WELLER.

Witnesses:
  JAS. A. COWLES,
  FRANK SAYRE OSBORNE.